United States Patent [19]

Calligaris

[11] Patent Number: 4,935,582
[45] Date of Patent: Jun. 19, 1990

[54] SPLICE ENCLOSURE FOR ELECTRICAL WIRES

[75] Inventor: Richard A. Calligaris, Wixom, Mich.

[73] Assignee: United Technologies Automotive, Inc., Dearborn, Mich.

[21] Appl. No.: 394,167

[22] Filed: Jan. 6, 1989

[51] Int. Cl.⁵ .......................................... H02G 15/113
[52] U.S. Cl. ....................................... 174/92; 174/76; 174/77 R; 174/84 R
[58] Field of Search .................... 174/92, 84 R, 88 R, 174/76, 77 R, 138 F

[56] References Cited

U.S. PATENT DOCUMENTS

| | | | |
|---|---|---|---|
| 2,803,696 | 8/1957 | Hefner | 174/92 |
| 2,894,056 | 7/1959 | Bogese | 174/92 |
| 3,183,302 | 5/1965 | Wochner et al. | 174/138 F |
| 3,278,674 | 11/1966 | Matthysse et al. | 174/138 F |
| 3,325,591 | 6/1967 | Wahl | 174/138 F |
| 3,332,053 | 7/1967 | Busier | 439/596 |
| 3,410,950 | 11/1968 | Freudenberg | 174/84 C |
| 3,419,669 | 12/1968 | Dienes | 174/84 R |
| 3,519,978 | 7/1970 | Taormina et al. | 439/596 |
| 3,715,459 | 2/1973 | Hoffman | 174/138 F |
| 3,727,174 | 4/1973 | Podmore et al. | 439/596 |
| 3,742,123 | 6/1973 | Haub, Jr. | 174/138 F |
| 3,757,031 | 9/1973 | Izraeli | 174/138 F |
| 3,852,516 | 12/1974 | Vander Ploog | 174/71 R |
| 4,176,245 | 11/1979 | Merlack et al. | 174/92 |
| 4,234,760 | 11/1980 | Lawson | 174/138 F |
| 4,451,696 | 5/1984 | Beinhaur | 174/92 |
| 4,550,220 | 10/1985 | Kitchens | 174/138 F |

FOREIGN PATENT DOCUMENTS

| | | | |
|---|---|---|---|
| 688848 | 6/1964 | Canada | 174/92 |
| 2127865 | 12/1971 | Fed. Rep. of Germany | 174/92 |

Primary Examiner—Morris H. Nimmo

[57] ABSTRACT

An enclosure for sealing, insulating and strain relieving a conductor splice of insulated electrical wires. The enclosure (34) has a molded housing (26) with a plurality of mirror-imaged cavities (38) for receiving and restraining spliced conductors (10) and the adjacent insulated portions of the electrical wires. A mastic sealer (2) may be disposed upon the internal face of the enclosure. The enclosure containing the mastic sealer is subsequently locked about the spliced portion of the insulated wires.

11 Claims, 1 Drawing Sheet

SPLICE ENCLOSURE FOR ELECTRICAL WIRES

This is a continuation of application Ser. No. 07/064,037 filed June 18, 1987, now abandoned.

TECHNICAL FIELD

The invention relates to an enclosure for providing environmental sealing, insulating and strain relief of a splice in electrical wires including insulations and conductors.

BACKGROUND ART

Splices in electrical wires are commonly used in the manufacturing of electrical wire assemblies. In the automotive field, for example, there may be numerous splices in one wire assembly in order to transmit electrical energy to outlying lights and various accessories. A common method of splicing electrical wires is to strip the insulation from the wires to be spliced exposing the bare conductors. The bare conductors are then welded together.

An alternative method of splicing electrical wires is to strip the insulation from the wires to be spliced exposing the bare conductors. The bare conductors are then placed in a crimped band and subsequently joined and secured by crimping the band about the conductors.

Before the wire assembly containing spliced wires is put into service, the bare conductors must be insulated against undesired short circuits and sealed against contaminants. This has previously been done in the past by wrapping the splice with dielectric tape. Tape, however, left the splice vulnerable to damage due to foreign objects or stray conductors puncturing the tape. Also, the conductor joints sustained damage due to excessive bending while the spliced wires were in transit.

An alternative to taping is to wrap a deformable material having sealing properties about the splice. Such a method provides a sufficient seal but does not protect the splice from damage occurring from objects puncturing the material or from excessive bending of the splice.

An alternative to taping or wrapping the splice with a deformable sealing material is to use a sealing insulator made of PVC molded directly onto the splice. However, installation of PVC covers requires that the wires be moved to another workstation for a subsequent molding process, thereby increasing the production time and cost of wire assemblies. Because a cover constructed of PVC is a relatively rigid material, it may not provide sufficient sealing of the spliced conductors from the environment when the wires are in service. Also, the intermediate handling of the spliced wires between the splicing process and the molding of the PVC cover at a separate workstation may result in occasional damage or breakage of the spliced conductors.

Preformed covers usually made of plastic have been used to provide an alternative to the molded-in-place covers made of PVC. However, the preformed plastic covers alone do not provide a sufficient seal about the splice. As a remedy, various sealants have been injected into the cover after the cover has been installed on the splice. Although the injectable sealant provides a sufficient seal, the step of injecting sealant after the installation of the preformed covers increases production time and cost.

Disclosure Of The Invention

An object of the invention is to provide a simplified, yet effective arrangement for environmentally sealing, insulating, and strain relieving spliced conductors of insulated electrical wires.

Another object of the invention is to provide apparatus to seal, insulate and strain relieve spliced conductors at the same workstation where the conductors are spliced.

A further object of the invention is to provide an arrangement for protecting the splice from damage due to stray objects coming into contact with the spliced conductors.

A still further object of the invention is to provide an arrangement for protecting the structural integrity of the spliced conductors from potential loads that may be applied to the splice.

Other objects may be apparent from the description to follow and the appended claims.

The above objects are achieved according to the preferred embodiment of the invention, by an enclosure, having a molded housing with a plurality of mirror imaged cavities, each cavity having insulation voids of a predetermined radius to accommodate and restrain movement of the still insulated portions of the wires. The insulation voids are connected by a conductor void which is of a preselected size to accommodate and restrain the spliced conductors of the insulated wires. A mastic sealer may be adhered to the interior of the housing at the time of manufacturing the enclosure, to simplify the installation of the enclosure on the splice and to reduce the time necessary for said installation. Locking means are provided to secure the enclosure now containing mastic sealer about the splice and the wires.

The unadhered portion of the mastic sealer may be covered with release paper to protect the mastic sealer which is removed prior to installing the invention to a splice.

The enclosure as disclosed above may be modified to accommodate a multiplicity of spliced electrical wires (i.e. a bundle) by forming a corresponding number of mirror-imaged cavities for receiving the desired number of spliced electrical wires.

The enclosure disclosed above may be formed with a plurality of housing members joined by a centrally located and longitudinally extending living hinge.

Also disclosed is a joint including both the enclosure as herein defined and electrical wires having insulations and conductors and wherein the conductors are spliced together.

BEST MODE FOR CARRYING OUT THE INVENTION

Figure 1:
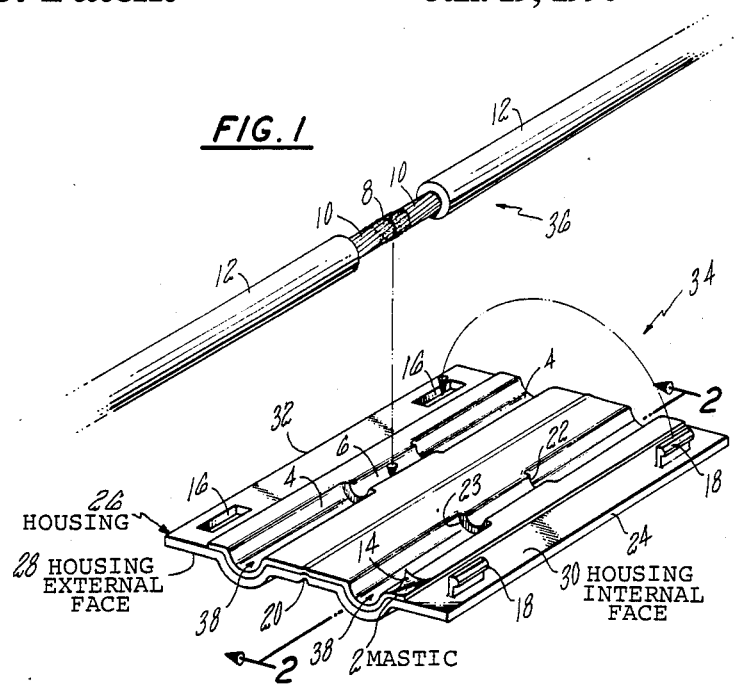
FIG. 1 is an exploded perspective view of the enclosure and spliced wires positioned to be secured within the enclosure.
Figure 2:
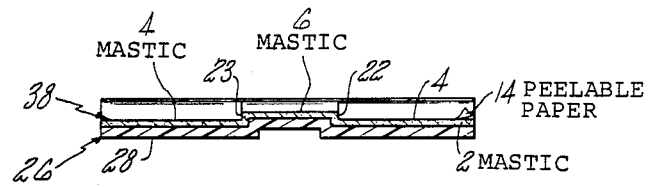
FIG. 2 is a cross sectional view of FIG. 1 taken at line 2—2.

The Figures illustrate the preferred embodiment of the present invention. Therein enclosure 34 includes housing 26 which is molded of a sufficiently rigid, plastic material capable of protecting splice 36 yet sufficiently pliable to allow for easy installation of enclosure 34 and that may also have insulating qualities. Preferably housing 26 is molded as a single body which has edges 32 and 24, internal face 30, and external face 28. Housing 26 also has a centrally-located, longitudinally-extending integral living hinge 20.

Housing 26 has a plurality of mirror-imaged cavities 38 located equidistant from living hinge 20. Each cavity 38 has a pair of insulation voids 4 of a predetermined radius for receiving and restraining the insulations 12 of the spliced wire 36. The insulation voids 4 are connected by conductor void 6 sized to receive conductors 10 and the conductor splice 8.

Mastic sealer 2 covers cavities 38 and conductor void 6 and is adhered to at least a portion of internal face 30. The mastic sealer 2 may be adhered to the entire internal face 30 including cavities 38 and conductor void 6. If desired, mastic sealer 2 may have cutout portions exposing portions of internal face 30 or cavities 38 or conductor void 6. The outward facing portion of mastic sealer 2 may be covered with release paper 14 to minimize the amount of nuisance bonding to undesired objects during packaging and storage of enclosure 34. Release paper is removed prior to installing the enclosure 34 upon spliced wire 36.

When the enclosure 34 is closed, securing spliced wire 36 therein, end wall 22 of insulation void 4 abuts against insulation 12 which prevents undesired longitudinal movement of enclosure 34 with respect to the spliced wire 36 along the axis of the wire. Opposite end wall 23 prevents undesired longitudinal movement of the enclosure 34 with respect to the spliced wire 36 in the opposite direction.

A preferred means of locking enclosure 34 about spliced wire 36 is to have a plurality of locking tabs 18 projecting from the internal face 30 and located in close proximity to the edge 24. When the enclosure 34 is in the closed position locking tabs 18 are secured in a corresponding number of cutouts 16 which are located in close proximity to edge 32 of the housing 26.

By locking the enclosure about the splice, the splice will be insulated, sealed, and enjoy strain relief from axial or bending loads that may be applied to the splice while the wires are in transit or in service. The strain relieving is obtained by the voids being of a preselected size that allows for the mastic sealer to fit between the housing and the wires yet being of a size that restrains the conductors and insulated portions of the wires from bending loads and from axial separation by the housing being locked about the splice. The locking causes sufficient radially-directed forces to be applied against the splice and the wires to offset bending loads or axial forces that may be applied to the splice. The mastic sealer acts to insulate the splice.

Although the invention has been shown and described with respect to a detailed embodiment, it will be understood by those skilled in the art that various changes in form and detail thereof may be made without departing from the spirit and scope of the invention.

I claim:

1. An enclosure for providing environmental sealing, insulating, and strain relief of a splice joining electrical wires that are surrounded by insulation which is stripped away for the splice characterized by:
   (a) a molded housing comprising two halves having opposing internal faces and containing a plurality of cavities which are the mirror image of cavities in the other half, a first pair of said cavities defining, when said halves are joined, a wire conductor void for receiving said splice and second and third pairs of cavities each defining, insulation receiving void for grasping the perimeter of insulation on each side of said splice;
   (b) hinge means joining the two halves on one side of the cavities for allowing the two halves to be pivotally joined together;
   (c) mastic sealer adhered to at least a portion of each internal face for providing a seal around the insulation and the splice as the two halves are joined; and
   (d) cooperating locking means for locking said two halves together.

2. The enclosure of claim 1, further characterized in that said mastic sealer is adhered to the internal faces of said housing in said second and third pair of cavities.

3. The enclosure of claim 2 further characterized by:
   release paper positioned to cover at least a portion of the mastic sealer to protect the mastic sealer prior to application of the enclosure to the splice.

4. The enclosure of claim 2 further characterized in that the hinge means comprises a living hinge.

5. The enclosure of claim 3 further characterized in that said living hinge is integrally formed with said two halves.

6. The enclosure of claim 1 further characterized in that said locking means comprises are elevated tab on one of said halves and an aperture on the second of said halves for receiving and engaging said tab.

7. The joint described in claim 6 further characterized in that said mastic sealer is adhered to the internal faces of said housing in said insulation voids.

8. An electrical joint which comprises:
   (a) a plurality of electrical wires each having a central conductor and surrounding insulation and said central conductors being joined to form a splice,
   (b) a preformed housing made of injected molded plastic, the housing having internal and external faces, edges, and a longitudinally extending living hinge means defining two housing halves that swing together around the hinge,
   (c) a plurality of mirror imaged cavities located equidistant from the living hinge means having a pair of insulation voids of a predetermined radius based on the radius of the wire including insulation for receiving and grasping the perimeter of the insulations of the wires, said insulation voids being connected by a conductor void for receiving the conductors and the conductor splice;
   (d) mastic sealer adhered to at least a portion of the internal faces of the housing for providing a seal around the insulation and the splice formed when the two halves are joined, and
   (e) means for locking the enclosure about the conductor splice and the insulation of the electrical wires to secure the insulations of the wires to the housing, whereby the housing in combination with the means for locking the enclosure and the mastic sealer will allow potential loads to be passed from one wire to another wire without passing through the connector splice connecting said wires and the joint will be environmentally sealed and insulated.

9. The joint as set forth in claim 8 and further comprising:
   release paper positioned to cover at least a portion of the mastic sealer to protect the mastic sealer prior to application of the enclosure to the splice.

10. The joint as set forth in claim 8 wherein the means for locking the enclosure comprises:

a plurality of locking tabs projecting from one of the internal faces of the preformed housing and located in close proximity to one of the edges; and corresponding cutouts in the preformed housing located in close proximity to the opposite edge for receiving the locking tabs.

11. The joint according to claim 10, further characterized in that at a position adjacent each insulation void there is a said insulation void for holding the two halves together.

* * * * *